United States Patent [19]

Bengtson

[11] Patent Number: 5,659,638

[45] Date of Patent: Aug. 19, 1997

[54] METHOD AND SYSTEM FOR CONVERTING BITMAP DATA INTO PAGE DEFINITION LANGUAGE COMMANDS

[75] Inventor: Michael Bengtson, Richton Park, Ill.

[73] Assignee: R. R. Donnelley & Sons Company, Chicago, Ill.

[21] Appl. No.: 468,912

[22] Filed: Jun. 6, 1995

Related U.S. Application Data

[63] Continuation of Ser. No. 926,198, Aug. 7, 1992, abandoned.

[51] Int. Cl.$^6$ .................................................. G06K 9/00
[52] U.S. Cl. ............................................. 382/299; 382/240
[58] Field of Search ..................................... 382/100, 209, 382/218, 309, 293, 317, 227, 177, 199, 181, 284, 173, 176, 178, 179, 180, 186, 187, 190, 195, 203, 217, 224, 310, 240, 299; 358/433, 470, 462; 395/128, 135; 345/136

[56] References Cited

U.S. PATENT DOCUMENTS

| | | | |
|---|---|---|---|
| 4,180,798 | 12/1979 | Komori et al. | 340/146.3 H |
| 4,180,799 | 12/1979 | Smith | 340/146.3 AC |
| 4,375,916 | 3/1983 | Levine | 355/5 |
| 4,499,499 | 2/1985 | Brickman et al. | 358/470 |
| 4,516,266 | 5/1985 | Christopher et al. | 382/48 |
| 4,566,039 | 1/1986 | Oya | 358/462 |
| 4,760,606 | 7/1988 | Lesnick et al. | 382/48 |
| 4,797,544 | 1/1989 | Montgomery et al. | 250/221 |
| 4,918,723 | 4/1990 | Iggulden et al. | 379/100 |
| 4,941,125 | 7/1990 | Boyne | 364/900 |
| 4,941,189 | 7/1990 | Britt | 382/46 |
| 4,972,499 | 11/1990 | Kurosawa | 382/38 |
| 5,048,113 | 9/1991 | Yamagata et al. | 382/57 |
| 5,185,818 | 2/1993 | Warnock | 382/54 |
| 5,218,460 | 6/1993 | Nakajima | 358/456 |
| 5,239,625 | 8/1993 | Bogart | 395/128 |
| 5,253,307 | 10/1993 | Wayner et al. | 382/22 |
| 5,278,915 | 1/1994 | Chupeau et al. | 382/240 |
| 5,293,432 | 3/1994 | Gonser et al. | 382/299 |

FOREIGN PATENT DOCUMENTS

| | | | |
|---|---|---|---|
| 0 134 997 A3 | 7/1984 | European Pat. Off. | G06K 9/60 |
| 61-098487 | 5/1986 | Japan | G06K 9/68 |
| 1-180083 | 7/1989 | Japan | G06K 9/62 |
| 4-013369 | 1/1992 | Japan | H04N 1/387 |
| 4-047756 | 2/1992 | Japan | H04N 1/32 |

OTHER PUBLICATIONS

Article entitled "Microsoft Licenses Panose Font Scheme" appearing in *The Seybold Report on Desktop Publishing*, p. 40. No Date or Place of Public. No Author.
Hofstadter, D.R., *Metamagical Themas: Questing for the Essence of Mind and Pattern*, Chapters 12, 13, Basic Books, Inc. New York 1985. No Page Number.
Knuth, Donald, The Concept of a Meta-Font, Visible Language 16, No. 1 (Winter 1982): 3–27. No Page Number.
Episode 8 of "Invention", © The Discovery Channel 1990. No Author or Date or Place of Public or Page Number.
European Search Report dated Dec. 20, 1994 (1 page). (Other Informations Not Applicable).

*Primary Examiner*—Leo Boudreau
*Assistant Examiner*—Bijan Tadayon
*Attorney, Agent, or Firm*—Marshall, O'Toole, Gerstein, Murray & Borun

[57] ABSTRACT

A method of and system for converting an original representation of a page element expressed in bitmap form into a page definition language representation of the page element develops an element approximation expressed in the page definition language, converts the element approximation into an approximation bitmap and compares the approximation bitmap to the original representation expressed in bitmap form to obtain an error indication. The error indication is checked to determine whether it meets a certain criterion and, if so, the element approximation is used as the page definition language representation. Otherwise, one or more further element approximations are developed until an element approximation is obtained that results in an error indication which meets the certain criterion.

36 Claims, 9 Drawing Sheets

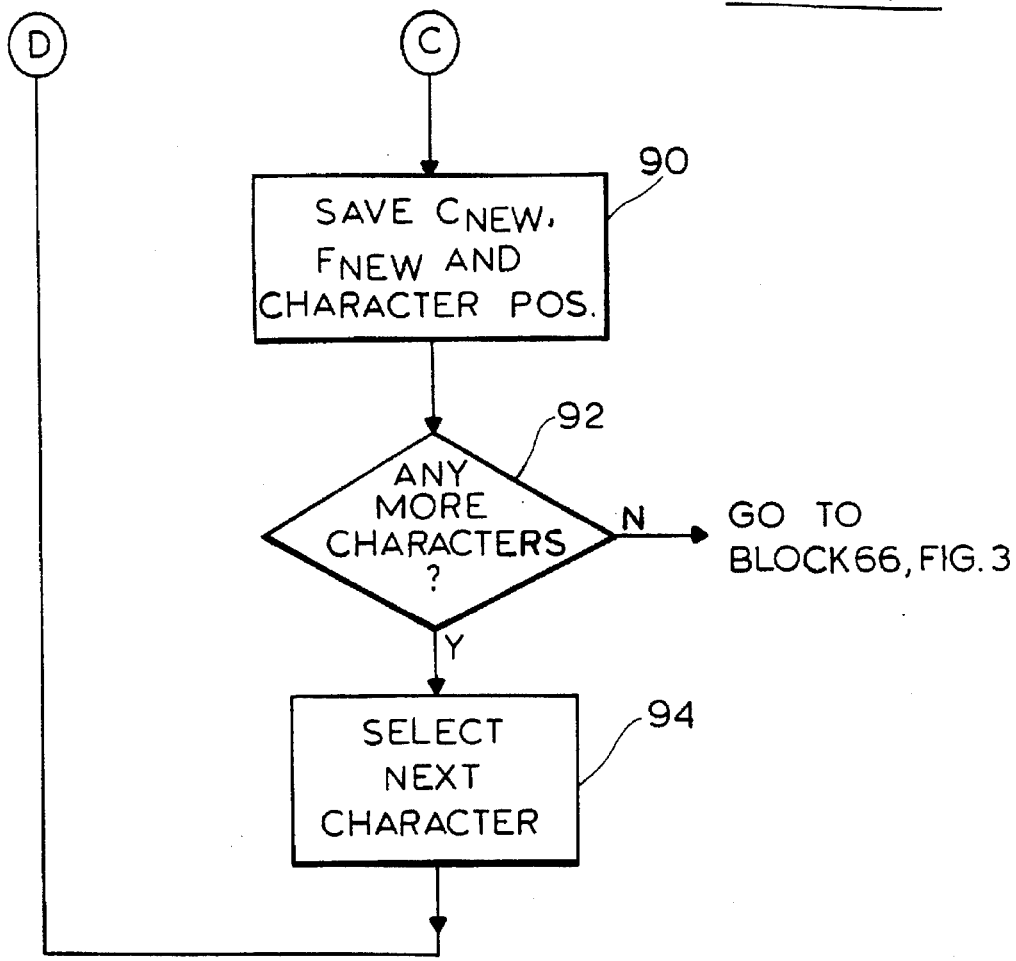

FIG.7
FROM BLOCK 60 OR 64, FIG.3
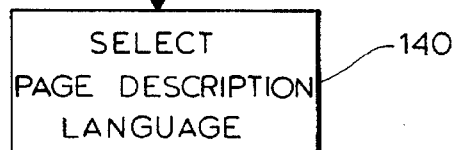
SELECT PAGE DESCRIPTION LANGUAGE —140
GENERATE PDL COMMANDS —142
GO TO BLOCKS 64 OR 68, FIG.3
FIG.8
FROM BLOCK 34, FIG.2A
OR BLOCK 56, FIG.2B
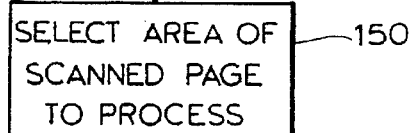
SELECT AREA OF SCANNED PAGE TO PROCESS —150
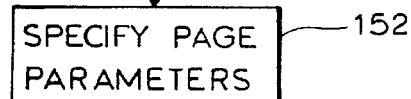
SPECIFY PAGE PARAMETERS —152
SPECIFY PROCESS PARAMETERS —154
TO BLOCK 38, FIG.2A
OR BLOCK 34, FIG.2A
FROM BLOCK 46, FIG.2B
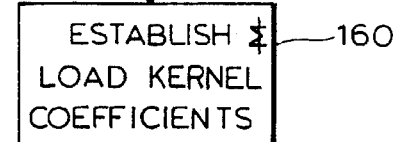
ESTABLISH & LOAD KERNEL COEFFICIENTS —160
PROCESS BITMAP FILE —168
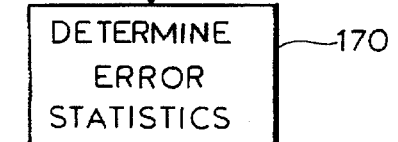
DETERMINE ERROR STATISTICS —170
TO BLOCK 50, FIG.2B
FIG.9

METHOD AND SYSTEM FOR CONVERTING BITMAP DATA INTO PAGE DEFINITION LANGUAGE COMMANDS

This is a Continuation of U.S. application Ser. No. 07/926,198, filed Aug. 7, 1992, now abandoned.

TECHNICAL FIELD

The present invention relates generally to methods and systems for converting data, and more particularly to a method of and system for converting image data in bitmap form into page definition language commands.

BACKGROUND ART

Often, it is desired to reproduce a book that has been taken out of print and for which printing plates are no longer available. One way to effectuate this result is to photograph the printed pages and use the resulting film images to create new printing plates. This method has the disadvantage of introducing noise into the reproduction process that in turn degrades the quality of the reproduced pages. Other reproduction methods, such as photocopying, result in pages of even poorer quality, and hence are not acceptable under most circumstances.

A still further reproduction method relies upon the use of optical character recognition (OCR) techniques wherein the pages to be reproduced are electronically scanned to develop an electronic file representing the characters on the page. Modern OCR techniques, however, cannot process nontext images, are limited in their recognition capability and require knowledge of the font in which the page characters are printed in order for sufficient accuracy to be obtained. This OCR reproduction method is thus restricted to those books or other printed material utilizing fonts that can be recognized. Such a restriction severely limits the types of source materials that can be reproduced. In addition, such a reproduction method does not retain information concerning the format or style of each page.

In recent years, page description languages (PDL's) like PostScript developed by Adobe Systems, Inc., of Mountain View, Calif., have been developed in an attempt to provide a standardized way of describing a printed page.

Methods and systems have been known for converting data expressed in a PDL into bitmap form. Typically, the PDL expresses page elements, such as images, line art or characters, as a series of shorthand expressions indicating the location of the page element and its appearance. The bitmap representation, on the other hand, comprises a series of digital values defining the page on a pixel-by-pixel basis. Such converters, otherwise known as raster image processors (RIP's), are used to drive printers or other output devices that do not include an interpreter for the page definition language.

SUMMARY OF THE INVENTION

In accordance with the present invention, a method of and system for converting data in bitmap format into page definition language facilitates reproduction of printed pages in a simple and accurate manner.

More particularly, a method of converting an original representation of an image expressed in bitmap form into a page definition language representation of the image includes the steps of establishing a first set of recognition parameters, using the established set of recognition parameters to convert the original representation into an image approximation expressed in the page definition language and converting the image approximation into an approximation bitmap. The approximation bitmap is compared to the original representation expressed in bitmap form to obtain an error indication. A determination is made whether the error indication meets a certain criterion, and, if so, the image approximation is used as the page definition language representation. Otherwise, one or more further image approximations expressed in the page definition language are derived, converted into image approximations and compared to the original representation to obtain one or more further error indications. The further error indications are checked to determine whether each meets the certain criterion and, if so, one of the further image approximations is used as the page definition language representation.

In accordance with another aspect of the present invention, a method of converting a bitmap representation of a character expressed in a font into a page definition language expression of the character includes the steps of detecting a characteristic of the character and using the detected characteristic to obtain successive estimates of the identity of the character and the font. A determination is made as to whether the successive estimates are the same and a page definition language expression of the character and the font is developed using one of the estimates if the successive estimates are the same. If the successive estimates are not the same, one or more further successive estimates are obtained and compared until two are the same, whereupon a page definition language expression of the character and font is developed using one of the estimates.

In accordance with yet another aspect of the present invention, a method of reproducing a plurality of characters each printed in a font at a position on a page includes the steps of converting the printed characters into a bitmap representation of same, selecting a first character and detecting characteristics thereof. The detected characteristics are utilized to develop character and font data representing the identity of the character and the font in which the character is expressed. The character and font data are stored together with position data representing the position of the character on the page. Characteristics of the remaining characters on the page are detected and the character and font data representing the identity of the characters and the fonts in which the characters are expressed are stored together with further position data representing the positions of the characters on the page. The stored character and font data and the position data are converted into page definition language expressions and the page definition language expressions are utilized to operate a printing device such that it produces a printed page.

In accordance with a still further aspect of the present invention, a system capable of commanding a printing device to reproduce a page having a plurality of characters printed thereon wherein each character has an identity and is printed in a font and wherein the printed page is represented by a bitmap representation includes means for detecting metrics of each character of the bitmap representation. Means are responsive to the detecting means for obtaining an estimate of each character including the identity thereof and the font in which such character is printed. Means are responsive to the obtaining means for comparing the estimates of the characters with the bitmap representation to obtain an error indication. Means are responsive to the comparing means for successively correcting character estimates until the error indication meets a certain criterion and means are provided for assembling printing device commands in a page definition language using the character estimates.

The present invention permits a book or other printed matter to be reproduced in a manner which not only conveys the informational content therein, but also the appearance of the printed page in a substantially exact manner.

BRIEF DESCRIPTION OF THE DRAWINGS

FIGS. 4A and 4B, when joined along the similarly lettered lines, together comprise a more specific flowchart of the programming executed by the block 64 of FIG. 3;

FIG. 7 comprises a more specific flowchart of programming executed by the blocks 62 and 66 of FIG. 3;

FIG. 8 comprises a more specific flowchart of programming executed by the block 36 of FIG. 2A and by the block 58 of FIG. 2B;

FIG. 9 comprises a more specific flowchart of programming executed by the block 48 of FIG. 2B; and FIG. 10 comprises a representation of an error bitmap illustrating calculation of error statistics by the blocks 160, 168 and 170 of FIG. 9.

DESCRIPTION OF THE PREFERRED EMBODIMENT

Figure 1:
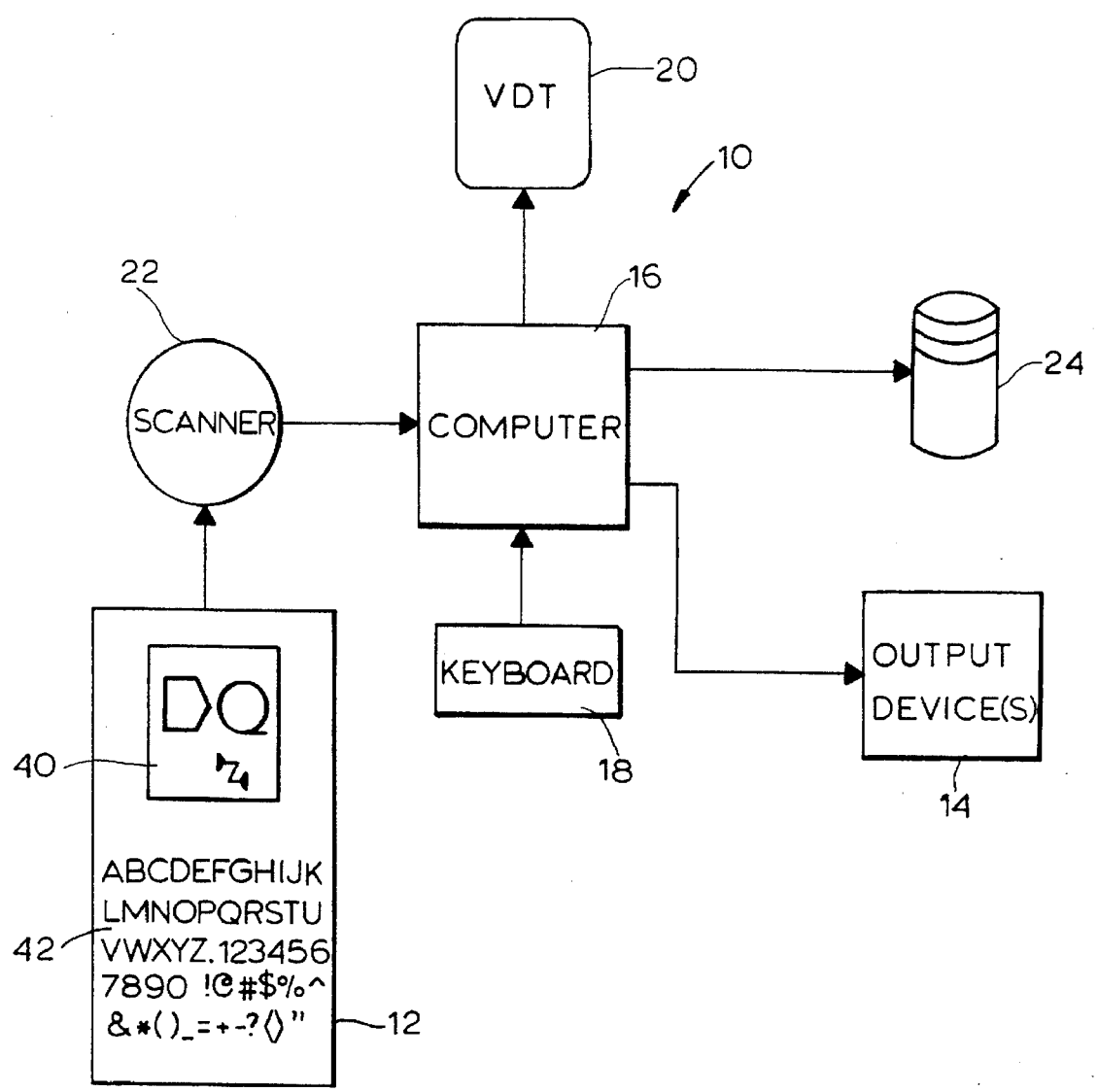
FIG. 1 comprises a simplified block diagram of the system according to the present invention.

Referring now to FIG. 1, a system 10 converts a printed page 12 into a series of page definition language (PDL) expressions or commands suitable for one or more output devices 14. The system 10 includes a computer 16 that may comprise, for example, a commercially available personal computer having a keyboard 18 and a video display terminal (VDT) 20. The computer 16 receives a bitmap representation of the page 12 from a scanner 22, which scans the page 12 on a pixel-by-pixel basis and develops digital values representing the density of each pixel of the page. If desired, the scanner 22 may be replaced by any device capable of digitizing a printed page.

In the preferred embodiment, the computer 16 converts the bitmap representation developed by the scanner 22 into the PostScript page definition language developed by Adobe Systems, Inc. of Mountain View, Calif. The computer 16 may alternatively develop commands or expressions in a different page description language, if desired. The PDL commands are used to operate a printer or one or more other output devices to reproduce the printed page 12. The commands or expressions may alternatively be delivered to a storage unit 24 for later processing, if desired.

Figure 2A:
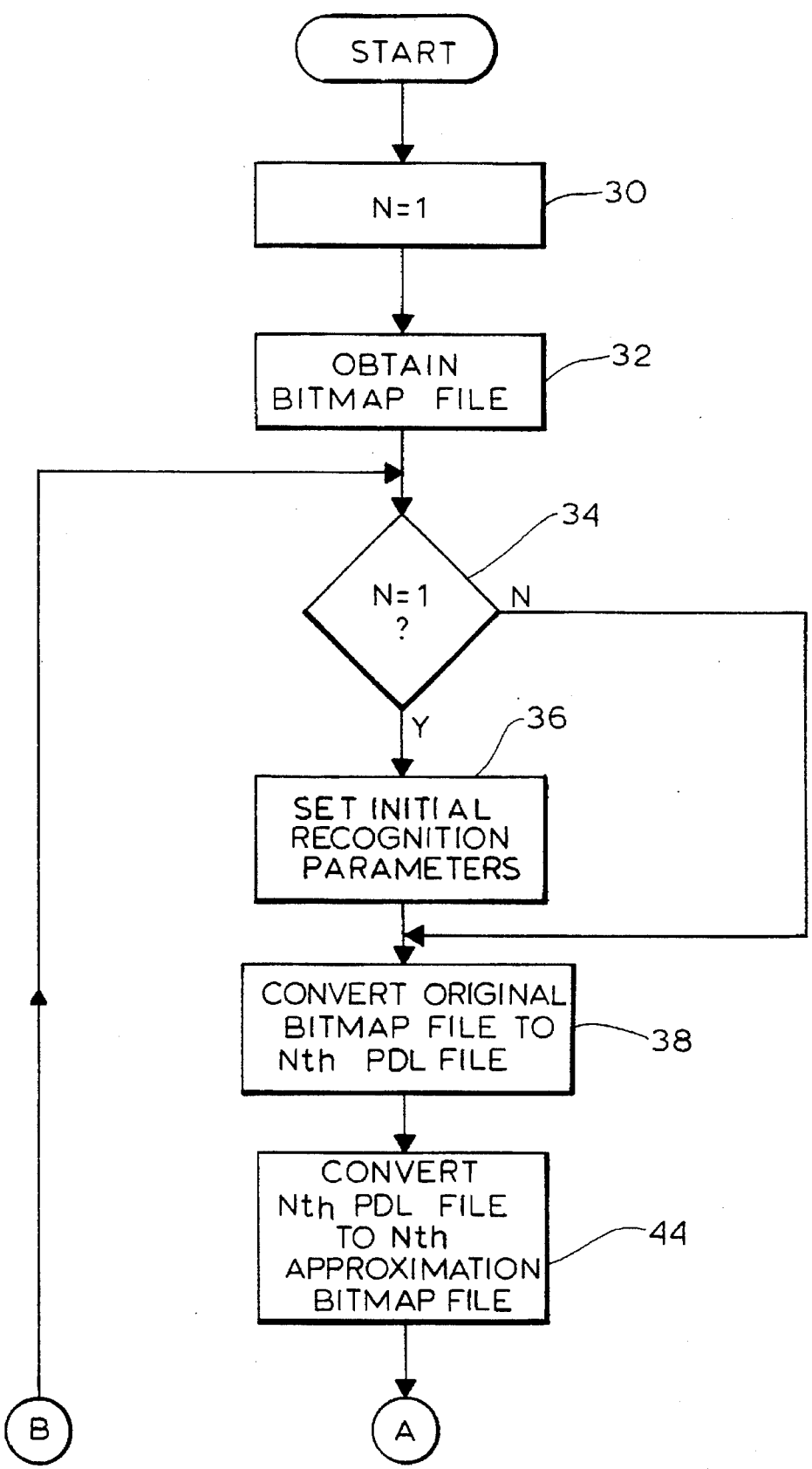
FIGS. 2A and 2B, when joined along the similarly lettered lines, together comprise a generalized flowchart of programming executed by the computer of FIG. 1 to convert a bitmap representation of a printed page into a page definition language (PDL) file.
Figure 2B:
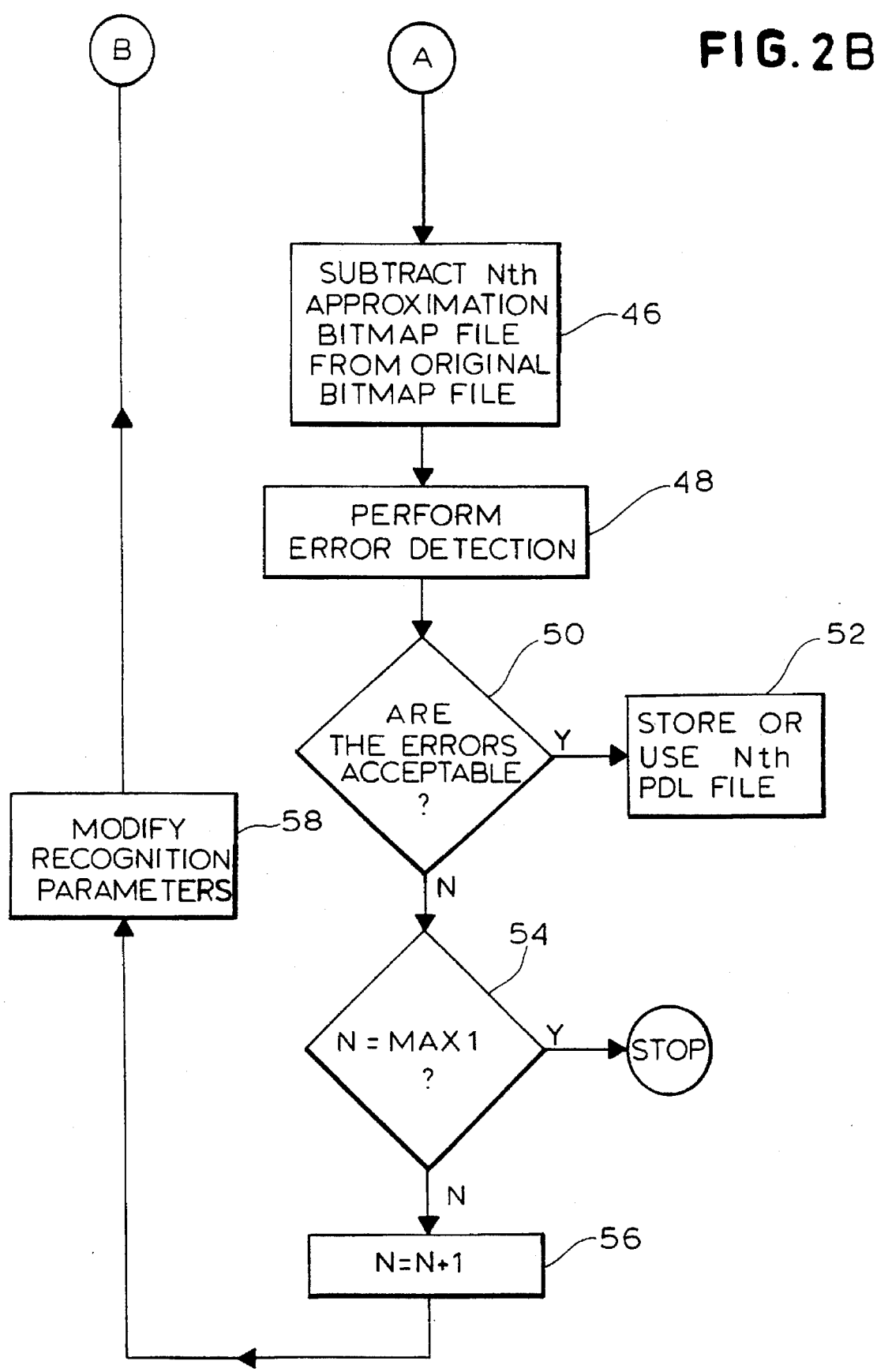

FIGS. 2A and 2B generally illustrate the programming executed by the computer 16 to effectuate the foregoing result. Processing begins at a block 30 that sets an iteration counter N equal to one. A block 32 then obtains the bitmap representation of the page 12 from the scanner 22. A block 34 checks to determine whether the iteration counter is equal to one and, if so, a block 36 permits an operator to establish initial recognition parameters that will later be used to estimate the identity of page characters and the font in which the characters are expressed.

Following the block 36, a block 38 converts the original bitmap representation of the page 12 into a PDL file. Referring again to FIG. 1, the block 38 separates the page 12 into a non-text portion 40, which may include, for example, page elements such as graphic images and line art, and a text portion 42 containing page elements in the form of characters each expressed in a font. The portions 40 and 42 are converted into PDL expressions separately and are later merged to create the PDL file.

Referring again to FIG. 2A, following the block 38, a block 44 executes a raster image processor (RIP) program to convert the assembled PDL file into an approximation bitmap file. A block 46, FIG. 2B, then compares the approximation bitmap file developed by the block 44 to the original bitmap representation Of the page 12. In the preferred embodiment, this comparison is effected by subtracting the approximation bitmap file from the original bitmap file to obtain an error indication or error bitmap. As noted in greater detail hereinafter, the conversion effected by the block 38 of FIG. 2A is not exact in the sense that estimates of character identities and fonts as well as other elements on the page are developed. This is particularly the case where the characters are printed in non-standard fonts or fonts having characteristics that do not precisely match stored characteristics. The block 46 of FIG. 2B thus develops an error indication which is checked against one or more error detection criteria by a block 48.

Following the block 48, a block 50 checks to determine whether the errors in the reproduced page are acceptable. This determination is based on one or more operator-specified criteria. Such a determination may be made even when one or more characters or fonts have not been recognized after all reasonable recognition options have been exhausted, in which case the original bitmap representations of such characters are merged with the PDL expressions of the remaining characters. If the block 50 determines that the errors are acceptable, a block 52 delivers the commands to the output devices 14 or stores such commands in the storage unit 24.

If the errors are found to be not acceptable by the block 50, a block 54 checks to determine whether the iteration counter N has achieved a maximum value MAX1. If so, then an iteration limit has been reached and further processing is terminated. Otherwise, the iteration counter N is incremented by one by a block 56 and control passes to a block 58. The block 58 allows for either automatic or operator-specified modifications of the recognition parameters in a way which improves the character identity and font recognition processes. Preferably, during the first and subsequent initial passes through the program, the recognition parameters are automatically modified so that the processing capabilities of the computer are utilized to the fullest possible extent. Thereafter, if the identity of the character or font has still not been ascertained, the recognition parameters may be modified by the operator, or it may be considered preferable to display the bitmap representation in question on the VDT 20 and to instruct the operator to enter the character/font identity directly via the keyboard 18.

Following the block 58, control returns to the block 34 which again checks to determine whether the iteration counter N is equal to one. During the second and subsequent passes through this portion of the program, N is greater than one, and hence control bypasses the block 36 and proceeds directly to the block 38 where the original bitmap file is converted to a second PDL file. The second PDL file is converted into a further approximation bitmap file and is compared against the original to obtain a further error indication. This further error indication is checked against the error criteria and a further determination is made by the block 50 as to whether the errors are acceptable. If not, control returns to the block 38 after the iteration counter is incremented and the recognition parameters are modified. Further PDL file estimates are produced until the error indication is reduced to a satisfactory degree or otherwise meets the error criteria. The resulting PDL file is then stored and/or used to operate the output device or devices 14.

Figure 3:
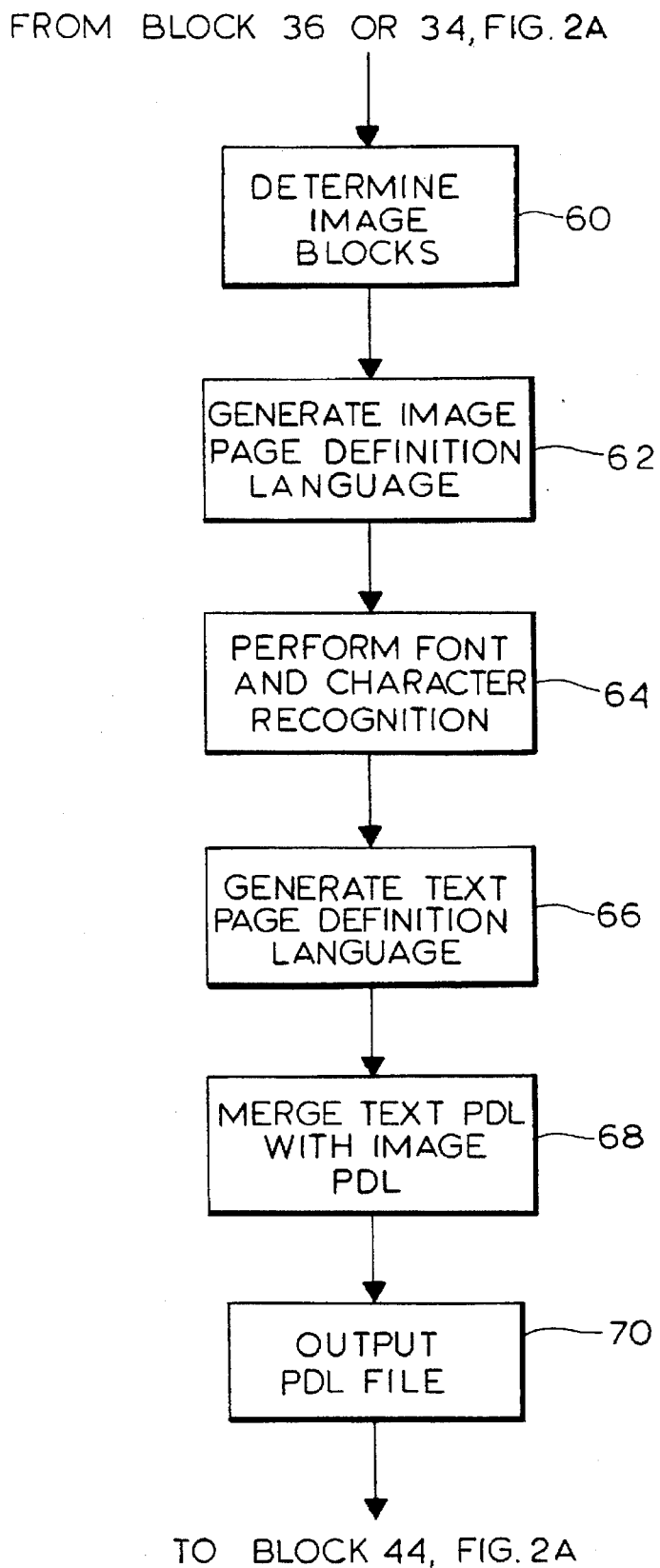
FIG. 3 comprises a more specific flowchart of the programming executed by the block 38 of FIG. 2A.

FIG. 3 illustrates the programming executed by the block 38 of FIG. 2A in greater detail. A block 60, which may be executed only once following scanning by the scanner 22 of the page 12, segregates those portions (called "image blocks") of the printed page 12 containing images such as line art or graphics. A block 62 then generates a page definition language expression for each image block. A block 64 then undertakes font and character recognition for the characters on the printed page 12. A block 66 thereafter generates page definition language expressions for the text portions of the page 12.

Following the block 66, a block 68 merges the text and image PDL expressions into a single file and the file is provided to the block 44, FIG. 2A, by a block 70.

Figure 4A:
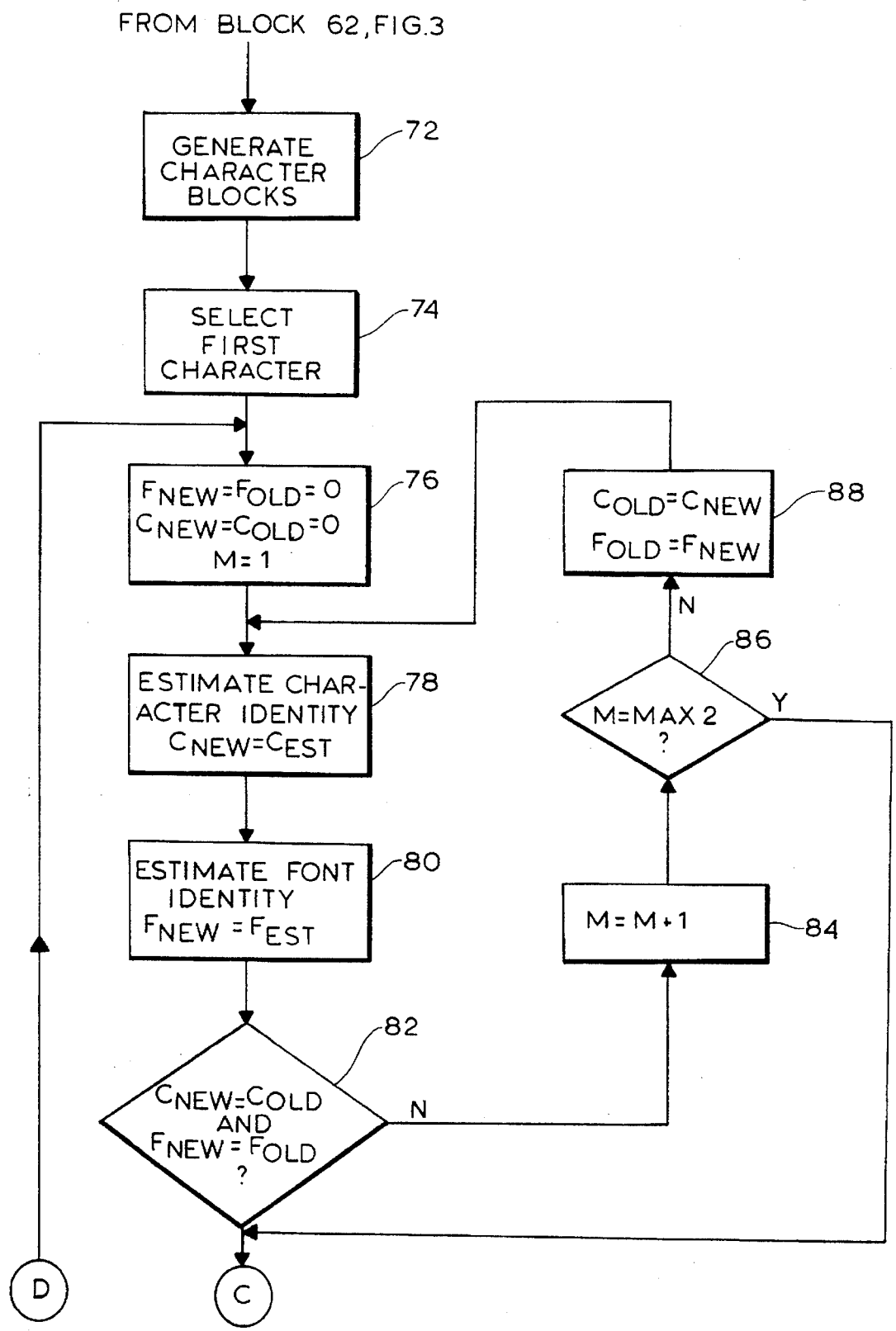

FIGS. 4A and 4B illustrate the programming executed by the block 64 of FIG. 3 in greater detail. Processing begins at a block 72 that subdivides the text portion of the page 12 into a plurality of character blocks. This is accomplished by defining character block boundaries surrounding each character. The block containing the first character is then selected by a block 74 and a block 76 sets the values of variables $F_{NEW}$, $F_{OLD}$, $C_{NEW}$ and $C_{OLD}$ equal to zero. In addition, a loop counter M is set equal to one.

Following the block 76, a block 78 estimates the identity of the character currently under consideration and assigns a value identifying such identity to the variable $C_{NEW}$. In like fashion, a block 80 estimates the identity of the font and assigns a value representative thereof to the variable $F_{NEW}$. The estimations effected by the blocks 78 and 80 are conducted in accordance with the recognition parameters established by the block 36 (in the case of the first pass through the program) or the block 58 (in the course of subsequent passes through the program).

A block 82 then checks to determine whether successive character identity and font identity estimates are the same. This is undertaken by checking to determine whether the variables $C_{NEW}$ and $F_{NEW}$ are equal to the variables $C_{OLD}$ and $F_{OLD}$, respectively. During the first pass through the programming shown in FIG. 4A, the variable $C_{NEW}$ will not be equal to the variable $C_{OLD}$ and the variable $F_{NEW}$ will not be equal to the variable $F_{OLD}$. Thus, control passes to a block 84, which increments the loop counter M, and a determination is made by a block 86 whether the loop counter has reached a maximum limit MAX2. If so, further processing is terminated and control passes to a block 90 of FIG. 4B. On the other hand, if the block 86 determines that the loop counter has not reached the maximum, a block 88 assigns the values $C_{NEW}$ and $F_{NEW}$ to the variables $C_{OLD}$ and $F_{OLD}$, respectively, and control returns to the block 78 where new estimates of the character identity and the font identity are made.

Control remains with the blocks 78–88 until two successive identical character and font estimates have been obtained. In this event, control passes to a block 90, FIG. 4B, which stores the current values of $C_{NEW}$ and $F_{NEW}$ and data representing the position of the character on the page. A block 92 then checks to determine whether all characters on the page have been processed. If so, control passes to the block 66 in FIG. 3. Otherwise, a block 94 selects the next character on the page and control returns to the block 76, FIG. 4A, where estimates of the next character are made.

As noted previously, once all the characters have been processed, the PDL expressions for the characters are developed by the block 66 of FIG. 3.

Figure 5:
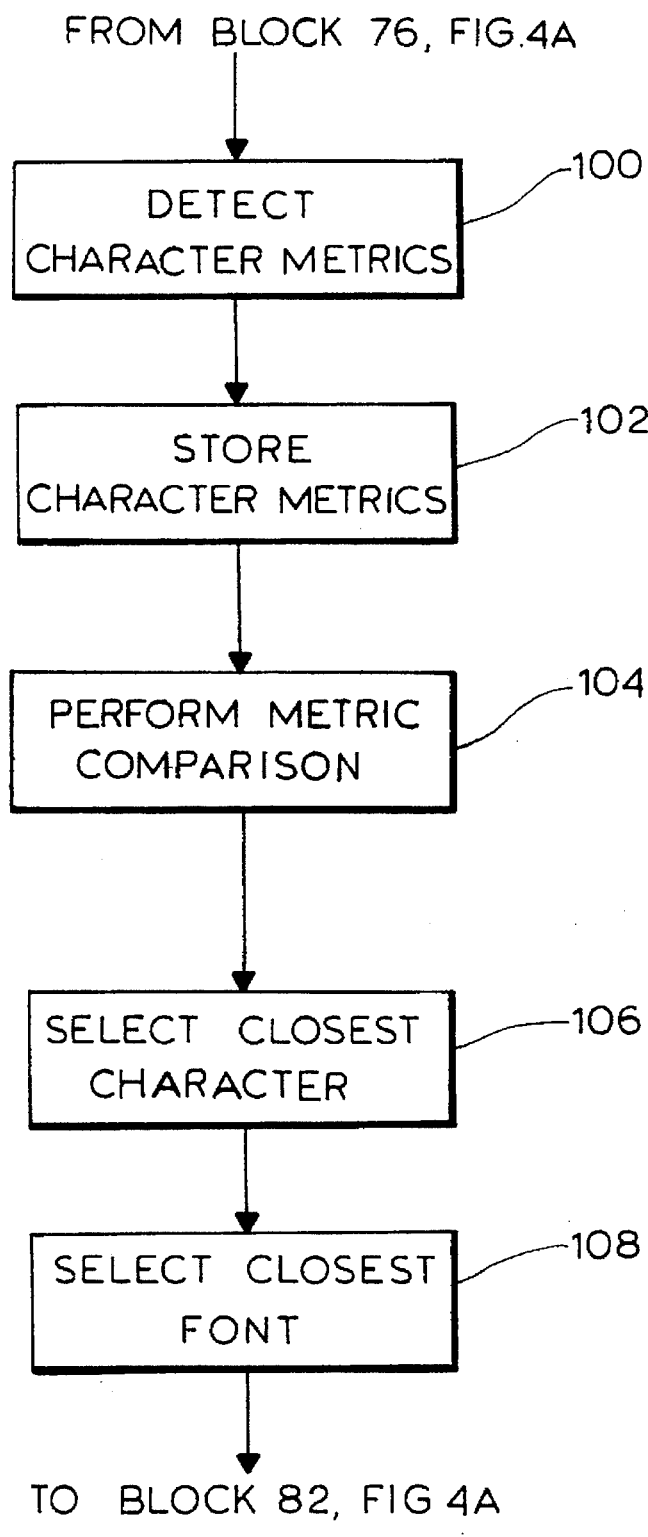
FIG. 5 comprises a more specific flowchart of programming executed by the blocks 78 and 80 of FIG. 4A.

FIG. 5 illustrates the programming executed by the blocks 78 and 80 of FIG. 4A in greater detail. A block 100 detects one or more characteristics (or "metrics") of the character currently under consideration. The metrics are used to identify a character and font, and include, but are not limited to, stroke width, reversals (i.e., the number of times a character outline changes direction), number of strokes per character (i.e., the number of separate nonintersecting outlines per character (e.g., the letter i has two strokes whereas the letter t has one stroke)), the outline acceleration (i.e., how fast the outline changes direction), the number of unconnected outline paths (e.g., the character o has two such paths, the character i has two such paths and the character t has one such path), the length of each outline, the ratio of the number of white pixels to black pixels in a character block, the angle of the character and the like. The angle of the character is determined by selecting equally spaced points on the outline of the character, calculating the slopes of lines tangent to the points and using a regression analysis to determine a line minimizing the least square error between the calculated slopes and the determined line.

Following the block 100, a block 102 stores the detected character metrics in a memory of the computer 16. A block 104 then compares the stored metrics against a library of previously created metrics for all fonts and characters which are to be searched. These metrics are created using the same process described previously and placed in the library.

A pair of blocks 106, 108 then select the closest character and closest font based upon the comparison conducted by the block 104. As previously noted, these selections are estimates in the sense that there may not be an exact match between the character currently under consideration and the stored character metrics. This variation can come about due to variations in print quality, smudges, erasures or other marks on the printed page or due to the fact that the font in which the character is printed simply does not have metrics matching any of the stored metrics.

Following the block 108, control passes to the block 82 of FIG. 4A.

Figure 6:
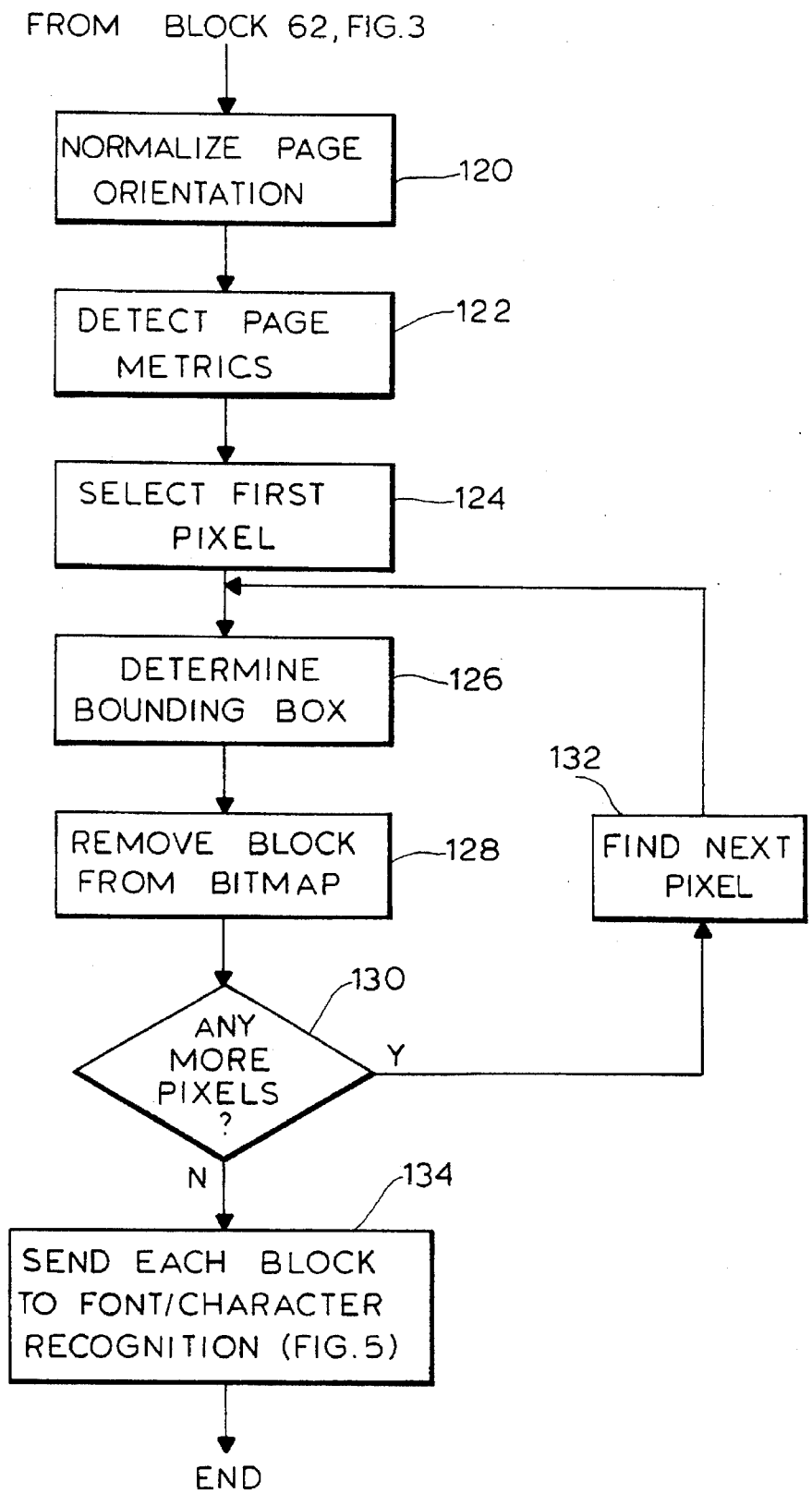
FIG. 6 comprises a more specific flowchart of the programming executed by the block 72 of FIG. 4A.

FIG. 6 illustrates the programming executed by the block 72 of FIG. 4A in greater detail. Following the block 62 of FIG. 3, a block 120 shifts the page orientation to a normalized position, if necessary. A block 122 then detects various page characteristics or metrics and stores same in the memory of the computer 16. These characteristics may include the page size, margin sizes and the number of the page in the scan sequence. A block 124 thereafter selects a first pixel of the page and a block 126 determines the boundaries of a box surrounding the character containing the pixel. This, in turn, defines a block which is removed from the bitmap by a block 128.

Following the block 128, a block 130 checks to determine whether there are further pixels to be processed. If so, a block 132 locates the next pixel on the page and control returns to the blocks 126–130. The foregoing process repeats until all pixels have been processed. Once all pixels have been processed, a block 134 sends each block to the font and character recognition portion of the programming illustrated in FIG. 5.

FIG. 7 illustrates the programming executed by the blocks 62 and 66 of FIG. 3 in greater detail. A block 140 permits selection of a particular page description language by the operator. In the preferred embodiment, as noted above, the page description language comprises PostScript, although a different language may alternatively be selected. A block 142 then generates the appropriate PDL commands and control continues to the blocks 64 or 68 of FIG. 3.

FIG. 8 illustrates the programming executed by the block 36 of FIG. 2A and the block 58 of FIG. 2B in greater detail. A block 150 selects an area of the scanned page to process. This area would preferably exclude images which are unrecognizable by the recognition process. Following the block 150, a pair of blocks 152, 154 allow automatic or operator-instituted specification of page and process parameters, respectively. Page parameters include, for example, the page size, page orientation (i.e., either portrait or landscape), line spacing, an approximation of character point size and margins. Process parameters include error thresholds, an indication of the number of passes through the programming before each page is considered "completed", the amount by which recognition parameters may change before the recognition process ends, and the like.

Following the block 154, control passes to the appropriate block 38 or 34 of FIG. 2A.

FIG. 9 illustrates the programming executed by the block 48 of FIG. 2B. The programming illustrated in FIG. 9 detects errors using a kernel calculated for each pixel. More particularly, FIG. 10 illustrates a portion of the error bitmap calculated by subtracting the Nth approximation bitmap file from the original bitmap file as executed by the block 46. A block 160 of FIG. 9 establishes, in the preferred embodiment, a 3×3 matrix of error bitmap values surrounding each pixel and further establishes coefficients for each bit in the bitmap matrix. Thus, for example, as seen in FIG. 10, a 3×3 matrix is established surrounding a particular error bit 162. The values stored in the matrix are in turn multiplied by kernel coefficients which, in the preferred embodiment, are all equal to 0.4, and the resulting multiplied values are summed together to obtain a kernel value. In the case of an error bit 162, the kernel value is equal to 0.4, owing to a "1" stored as an error bit 164 and zeroes in the remaining bits of the 3×3 matrix.

As a further example, where the kernel value for a bit 166 is to be calculated, the values in the 3×3 matrix surrounding such bit are multiplied by the kernel coefficients and the resulting values are added together to arrive a value of 0.4+0.4+0.4+0.4=1.6. A block 168 performs the foregoing kernel calculation and a block 170 compares each kernel value against an operator specified limit. If the limit is exceeded a certain number of times, then the error is determined to be unacceptable by the block 50 and control passes to the block 54 of FIG. 2B. On the other hand, if less than the certain number of kernel values exceed the operator specified limit, then the errors are considered to be acceptable and control passes to the block 52 of FIG. 2B.

As an alternative to the foregoing operation, the kernel values for the entire page may be summed and compared against an operator specified limit. In this case, if the limit is exceeded, the block 50 passes control to block 54 for further processing. If, however, the total of the kernel values is less than the operator-specified limit, then the errors are considered acceptable by the block 50 and control passes to the block 52.

If desired, a different error detection scheme may be utilized, as should be evident to one of ordinary skill in the art.

As is evident from the foregoing, the present invention is useful to convert a scanned page into PDL expressions. This is particularly useful to convert old printed material into a form for electronic publication on CD-ROM or using multimedia. Also, the present invention is capable of recognizing all errors in the conversion process, in turn potentially allowing error free recognition.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A method of reproducing a page element by converting a bitmap representation of the page element at a first resolution into a page definition language representation of the page element, the method comprising the steps of:

(a.) establishing a first set of recognition parameters;

(b.) using the established set of recognition parameters to convert the bitmap representation into an element approximation expressed in the page definition language, wherein the element approximation includes an indication of an approximation of the identity of the page element and an indication of an approximation of a font in which the bitmap representation is expressed, and wherein the page element is reproducible from the element approximation at a second resolution different than the first resolution;

(c.) converting the element approximation into an approximation bitmap;

(d.) comparing the approximation bitmap to the bitmap representation to obtain an error indication;

(e.) determining whether the error indication meets a certain criterion; and (f.) reproducing the page element using the element approximation as the page definition language representation if the error indication meets the certain criterion; or (g.) repeating steps (b.) through (f.) at least once if the error indication fails to meet the certain criterion using at least one different established set of recognition parameters until an element approximation is obtained that results in an error indication which meets the certain criterion.

2. The method of claim 1, wherein the page element comprises a character having an identity and expressed in a font and wherein the step (b.) includes the step of estimating the identity of the character and the font.

3. The method of claim 2, wherein the step of estimating the identity of the character and the font includes the step of comparing the bitmap representation with stored character bitmaps.

4. The method of claim 1, wherein the step (d.) comprises the step of subtracting the approximation bitmap from the bitmap representation to obtain the error indication.

5. The method of claim 1, wherein the page definition language comprises PostScript.

6. A method of reproducing a character by converting a bitmap representation of the character expressed in a font at a first resolution into a page definition language expression, the method comprising the steps of:

(a.) detecting a characteristic of the character;

(b.) using the detected characteristic to obtain one estimate of the identity of the character and the font;

(c.) using the detected characteristic to obtain another estimate of the identity of the character and the font to thereby develop successive estimates;

(d.) determining whether the successive estimates are the same; and (e.) developing a page definition language expression from which the character is reproducible at a second resolution different than the first resolution, the page definition language expression including an indication of the identity of the character and an indication of the font using at least one of the estimates if the successive estimates are the same; or (f.) repeating the steps (c.) through (e.) at least once if the successive estimates are not the same until two successively obtained estimates are the same; and (g.) reproducing the character using the page definition language expression.

7. The method of claim 6, wherein the step (b.) includes the steps of establishing a first set of recognition parameters and obtaining the one estimate based on the first set of recognition parameters.

8. The method of claim 7, wherein the step (c.) includes the steps of establishing a second set of recognition parameters and obtaining the other estimate based on the second set of recognition parameters.

9. The method of claim 6, wherein the step (a.) includes the step of detecting character metrics.

10. The method of claim 9, wherein each step (b.) and (c.) includes the step of comparing the detected character metrics with stored character metrics.

11. The method of claim 6, wherein the step (e.) comprises the step of developing a PostScript expression of the character and font.

12. A method of reproducing a plurality of printed characters each printed in a font at a position on a page, the method comprising the steps of:

(a.) converting the printed characters into a bitmap representation of same at a first resolution;

(b.) selecting a first character;

(c.) detecting characteristics of the character;

(d.) using the detected characteristics to develop character and font data representing the identity of the character and the font in which the character is expressed;

(e.) storing the character and font data together with position data representing the position of the character on the page;

(f.) repeating steps (c.)–(e.) for remaining characters on the page;

(g.) converting the stored character and font data and the stored position data into page definition language expressions from which the characters are reproducible at a second resolution different than the first resolution; and (h.) using the page definition language expressions to operate a printing device so that the printing device reproduces at least one of the printed characters.

13. The method of claim 12, wherein the step (a.) comprises the step of using a scanner to convert the printed characters into the bitmap representation.

14. The method of claim 12, including the further step of dividing the bitmap representation into a plurality of blocks each of which includes a character.

15. The method of claim 12, wherein a nontext portion is printed at a certain position on the page and including the further steps of converting the nontext portion into a further page definition language expression and merging the further page definition language expression with the page definition language expressions obtained in step (g.).

16. The method of claim 12, wherein the step (d.) includes the steps of successively deriving character identity and font estimates that approach the character identity and font and developing the character and font data when successive character identity and font estimates match.

17. The method of claim 12, wherein the step (g.) comprises the step of deriving PostScript expressions from the stored character and font data and the stored position data.

18. A system capable of commanding a printing device to reproduce a page having a plurality of characters printed thereon in a font and wherein the printed page is represented by a bitmap representation at a first resolution, the system comprising:

means for detecting metrics of each character of the bitmap representation;

means responsive to the detecting means for obtaining an estimate of each character including the identity thereof and the font in which such character is printed;

means responsive to the obtaining means for comparing the estimates of the characters with the bitmap representation to obtain an error indication;

means responsive to the comparing means for successively correcting character estimates until the error indication meets a certain criterion; and means for assembling printing device commands in a page definition language using the character estimates; and means for commanding the printing device to execute the printing device commands and thereby reproduce the characters at a second resolution different than the first resolution.

19. The system of claim 18, in combination with means for converting the printed page into the bitmap representation.

20. The system of claim 19, wherein the developing means comprises a scanner.

21. The system of claim 18, wherein the page further includes a nontext image printed thereon represented by a nontext bitmap representation and further including means for converting the nontext bitmap representation into nontext printing device commands in the page definition language.

22. The system of claim 18, wherein the comparing means comprises means for developing an estimate representation in the page definition language from the estimates, means for converting the estimate representation into an estimate bitmap and means for subtracting the estimate bitmap from the bitmap representation to obtain the error indication.

23. The system of claim 18, wherein the means for successively correcting includes means for establishing a succession of recognition parameters and means for deriving character estimates in accordance with the succession of recognition parameters.

24. The system of claim 18, wherein the assembling means comprises means for developing commands in PostScript.

25. A method of converting a bitmap representation of a page element into a page-definition-language representation of the page element, the method comprising the steps of:

(a) establishing a first set of recognition parameters;

(b) using the established set of recognition parameters to convert the bitmap representation into an element approximation expressed in the page-definition language and having an associated storage requirement, wherein the element approximation includes an indication of an approximation of a font in which the page element is expressed, and wherein the page element is reproducible from the element approximation at a resolution that is independent of the associated storage requirement of the element approximation;

(c) converting the element approximation into an approximation bitmap;

(d) comparing the approximation bitmap to the bitmap representation to obtain an error indication;

(e) determining whether the error indication meets a certain criterion; and (f) using the element approximation as the page-definition-language representation if the error indication meets the certain criterion; or (g) repeating steps (b) through (f) at least once if the error indication fails to meet the certain criterion using at least one different established set of recognition parameters until an element approximation is obtained that results in an error indication which meets the certain criterion.

26. The method of claim 25, further comprising the step of using the page definition language representation to reproduce the page element at a predetermined resolution.

27. The method of claim 26, wherein the bitmap representation has a bitmap resolution and wherein the predetermined resolution at which the page element is reproduced is independent of the bitmap resolution.

28. The method of claim 26, wherein the bitmap representation has a bitmap resolution and wherein the predetermined resolution at which the page element is reproduced exceeds the bitmap resolution.

29. The method of claim 25, wherein the page element comprises a character having an identity and expressed in a font and wherein the step (b) includes the step of estimating the identity of the character and the font.

30. The method of claim 29, wherein the step of estimating the identity of the character and the font includes the step of comparing the original representation with stored character bitmaps.

31. The method of claim 25, wherein the step (d) comprises the step of subtracting the approximation bitmap from the bitmap representation to obtain the error indication.

32. The method of claim 25, wherein the page definition language comprises PostScript.

33. A method of reproducing a printed page element, comprising:

developing a bitmap representation of the printed page element;

establishing a set of recognition parameters;

using the established set of recognition parameters to convert the bitmap representation into an editible element approximation expressed in a page definition language;

converting the element approximation into an approximation bitmap;

comparing the approximation bitmap to the bitmap representation to obtain an error indication; and adopting the element approximation as the reproduction of the page element if the error indication satisfies a certain criterion.

34. The method of claim 33, wherein the page element comprises a character having an identity and expressed in a font and wherein the step of using includes the step of estimating the identity of the character and the font.

35. The method of claim 33, wherein the step of comparing includes the step of subtracting the approximation bitmap from the bitmap representation to obtain the error indication.

36. The method of claim 33, wherein the page definition language comprises PostScript.

* * * * *